Figure 1:
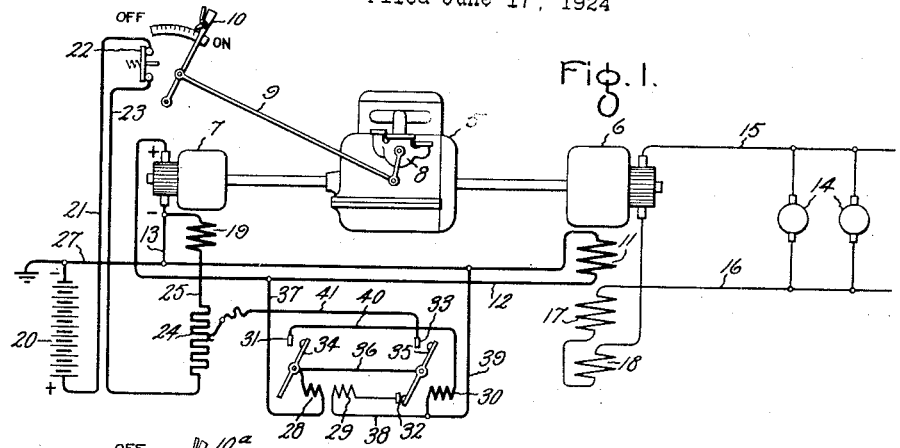

June 15, 1926.

H. LEMP 1,589,182

SELF PROPELLED VEHICLE

Filed June 17, 1924

Inventor:
Hermann Lemp,
by Alexander S. Lunt
His Attorney.

Patented June 15, 1926.

1,589,182

UNITED STATES PATENT OFFICE.

HERMANN LEMP, OF ERIE, PENNSYLVANIA, ASSIGNOR TO GENERAL ELECTRIC COMPANY, A CORPORATION OF NEW YORK.

SELF-PROPELLED VEHICLE.

Application filed June 17, 1924. Serial No. 720,713.

The present invention relates to self-propelled vehicles wherein an internal combustion engine drives a generator which in turn supplies current to electric motors connected to axles of the vehicle.

Heretofore vehicles of this character have been open to the serious objection that considerable skill has been required on the part of the operator to handle them in a manner to utilize efficiently at all loads the full power generated by the engine, it having been required to accomplish this that the electrical connections be manipulated in a very definite manner, the operator being guided by suitable electrical indicating instruments. To do this requires a good knowledge of the electrical equipment and good judgment, a combination seldom to be found among vehicle operators. Furthermore if the operator is called upon to operate electrical equipment it requires the major portion of his attention and does not leave him free to give attention to other matters. For example, in case the vehicle is used on a railroad as a switching engine, the operator is called upon not only to manipulate the vehicle forward and back at different rates of speed, but he must also continuously watch the signals of the yardman in order to learn what to do.

It follows, therefore, that even though the operator is skilled in running the car, nevertheless in dividing his attention between the control mechanism for the car and the yardman, he may operate the vehicle very poorly and even overload and stall the engine. This latter is a serious thing in connection with a case of this character and if even likely to occur, is a serious drawback to the vehicle.

As a result of this and other causes, the gas-electric or oil-electric driven vehicle as it is usually termed, (depending upon whether the engine is a gas engine or an oil engine), has met with only indifferent success up to this time.

The primary object of my present invention is to provide an improved control for vehicle drives of this character wherein the vehicle is controlled entirely by controlling the engine, the electrical control being entirely automatic and wherein the electrical control while being automatic, is simple in character, involves no moving parts, and utilizes the power of the engine efficiently at all loads.

A further object of my invention and one of great importance also, is to provide a control involving only a single lever which the operator moves forward and back to increase and decrease the power of the engine thereby rendering the control as simple as that of a steam engine, the operator having only one control lever and his air brake lever to manipulate. In no case is he required to notice any electrical instruments to guide him in the efficient operation of the vehicle.

A further object of my invention is to provide a control in the use of which the operator can in no case overload and stall the engine. In connection with this phase of my invention it is actually possible with an equipment embodying my invention to set the brakes up tight so the vehicle will remain stationary, open the engine wide until it is generating full load, that is, throw the engine throttle control lever to full load position, and then start the vehicle and run it up to full speed by gradually releasing the brakes. Or, with the throttle in any position, I can apply the brakes and stop the vehicle without stalling the engine.

A further object of my invention is to provide an electric drive of this type wherein the generator will build up quickly in response to a movement of the control lever for the engine whereby the starting will be quick and the acceleration rapid.

According to my invention, I provide an engine having constant torque at all speeds or increasing torque with falling speeds, a generator driven thereby and connected to motors on the vehicle axles, and an exciter for the generator which is driven by the engine also, and I then provide in connection with either the field windings of the generator or the field windings of the exciter, a field winding in series with the generator load which series winding is wound in a direction to oppose the field winding of the generator or of the exciter, thereby providing a differential series field winding, and I then so proportion the differential series field winding that upon an increase in armature current due to an increased demand for tractive effort, its demagnetizing effect coupled with the decrease in the voltage of the exciter caused by the decrease in engine speed due to the increased load will be such that the voltage of the generator will decrease at a rate greater than the speed of the engine.

Thus the load, which at any particular value of the armature current is proportional to the voltage, will fall with a decreasing engine speed faster than the power of the engine falls with the same decrease in speed and the engine speed will become stable at the value where the power of the engine balances the load.

I have discovered that by using in the foregoing arrangement an engine having a constant torque at all speeds or increasing torques with falling speeds in connection with an exciter driven by the same engine for exciting the generator, I accomplish most important results in that I am enabled to provide an almost constant energy output for the generator over a wide speed range and at the same time never bring the energy output of the generator to a value greater than the power output of the engine. This phase of my invention is discussed more fully hereinafter.

Figure 3:
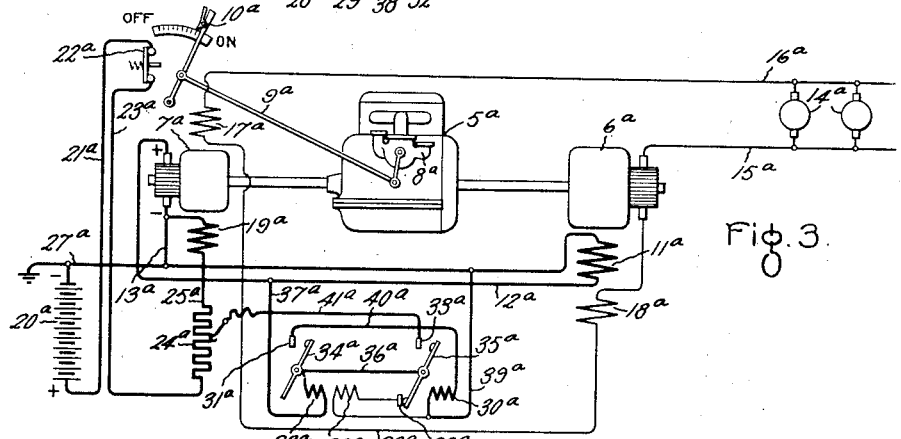
Figure 2:
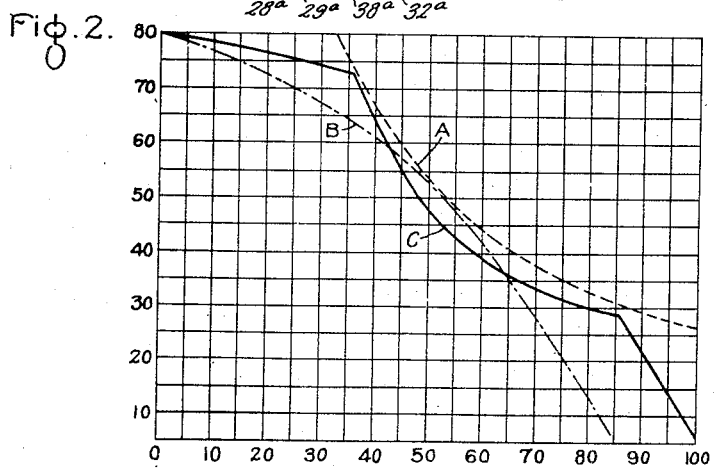

In the drawing Fig. 1 is a diagrammatic view of an equipment embodying my invention; Fig. 2 is a diagram illustrating the operation of my invention; and Fig. 3 is a diagrammatic view of a modification.

Referring to the drawing, Fig. 1, 5 indicates an internal combustion engine such as a gas engine or an oil engine to which is directly connected a direct current generator 6 and an exciter 7. The controlling means for the engine, here indicated as being in the form of a throttle valve 8, is connected by a link 9 to an operating handle 10. Generator 6 is provided with a field winding 11 which is connected directly to the terminals of exciter 7 by conductors 12 and 13, conductor 12 leading to the positive terminal of the exciter and conductor 13 to the negative terminal thereof. At 14 is indicated the load on the generator which load is in the form of motors for driving the car or vehicle. Motors 14 are connected to generator 6 by conductors 15 and 16 and in this circuit is a differential series field winding 17 which opposes field winding 11. Also in this circuit is a cumulative series commutator field winding 18 such as is usually provided in connection with generators of this type.

Exciter 7 has a field winding 19 to which is connected a storage battery 20 by way of conductors 21, switch 22, conductor 23, resistance 24, conductor 25, field winding 19, and conductors 13 and 27. Switch 22 may be of any suitable type, a snap switch biased to a closed position being employed preferably, and the arrangement is such that when control handle 10 is in "off" or idling position, it engages switch 22 to open it and that when control handle 10 is moved away from "off" or idling position, it releases the switch and permits it to close automatically. Switch 22 may also and is preferably utilized to close the energizing circuit of a contactor which in its turn closes the battery-charging circuit, and an arrangement of this character is shown in the drawing.

Exciter 7 is connected to battery 20 to charge it by a charging circuit including a suitable reverse current relay which relay includes a holding magnet 28, operating magnets 29 and 30, contacts 31, 32 and 33 and contact levers 34 and 35 which are electrically connected together by a conductor 36. The exciter is connected to operating magnet 29 by an operating circuit which may be traced from the positive terminal of the exciter through conductor 12, a conductor 37, holding magnet 28, conductor 36, contact lever 35, contact 32, operating magnet 29, and conductors 38 and 39, to conductor 13 and thence by way of conductor 13 to the negative terminal of the exciter. Whenever the potential of exciter 7 reaches a value a predetermined amount higher than that of the battery then the arrangement is such that operating magnet 29 will move contact lever 34 into engagement with contact 31 thus closing a circuit through operating magnet 30 from the positive side of exciter 7 through conductor 12, conductor 37, holding magnet 28, control lever 34, contact 31, a conductor 40, operating magnet 30 and conductors 39 and 13 to the negative terminal of exciter 7. Operating magnet 30 then moves lever 35 away from contact 32 thus opening the operating circuit through magnet 29, and into engagement with contact 33 closing a battery charging circuit from the positive terminal of exciter 7 through conductors 12 and 37, holding magnet 28, conductor 36, contact arm 35, contact 33, a conductor 41, resistance 24, conductor 23, switch 22, conductor 21, battery 20, and conductors 27 and 13 to the negative terminal of the exciter. The arrangement is such that as long as the potential of the exciter is higher than that of the battery 20, holding magnet 28 will remain energized to maintain the charging circuit closed. When the exciter voltage falls below the battery voltage, however, then magnet 28 permits contact arm 34 to move to effect the opening of the battery-charging circuit.

In any event, when operating handle 10 is moved to "off" or idling position, switch 22 is operated to open the battery circuit.

When operating handle 10 is in "off" or idling position switch 22 is held open so that battery 20 is disconnected from exciter field 19. As a result no power is generated by either the exciter 7 or the generator 6. Now as soon as control handle 10 is moved toward "on" position, switch 22 closes immediately connecting battery 20 to exciter field 19. The voltage generated by exciter 7 thus increases rapidly and supplies current to the field 11 of generator 6 causing it to quickly build up voltage and supply energy to motors 14. The current supplied by generator 6 to motors 14 flows through differential series field 17 which is opposed to the field winding 11 so that the effective field of generator 6 is the resultant of the two opposed fields 11 and 17, and it will be clear that as the current flowing in the load circuit increases, the field of generator 6 is weakened thus decreasing the voltage and thereby tending to maintain constant load on the generator.

The use of differential field windings on a generator for maintaining constant load has been proposed heretofore (see the patent to Krieger 752,689, Feb. 23, 1904) but the difficulty with such proposed systems has been that they were capable of maintaining constant load over but a very small speed range of the vehicle without adjustments of the electrical connections. This is illustrated in Fig. 2 wherein the ordinates represent percentage of safe voltage and the abscissa represent percentage of maximum safe momentary armature current. The dotted line A represents what may be termed the ideal volt-ampere characteristic, voltage times current being a constant, indicating constant load over a wide speed range; this ideal curve is a rectangular hyperbola. The dot and dash line B indicates the volt-ampere characteristics obtained in a case wherein the main generator field is excited by a source of constant potential such as a storage battery and it will be seen that there is but a short range wherein curve B approximates the ideal curve A. This means that for a system of that character it is necessary to adjust the electrical connections as the speed changes in order to obtain approximately constant load, that is bring curve B into approximate conformity with curve A.

Now, with the arrangement shown in the drawing wherein the field of the generator is energized by an exciter driven by the engine, an increase in armature current due to an increased demand for tractive effort results not only in a decrease in the main generator voltage owing to an increase in the strength of differential field winding 17 but also in a decrease in the exciter voltage due to decrease in engine speed upon increase in load and I have found that by combining these two results coupled with the saturation effect of the main generator field, I can obtain a volt-ampere curve of the character indicated by the full line C in Fig. 2, such line approximating the ideal curve A over a wide speed range. This means that the set can be operated efficiently over this speed range without adjustment of the electrical connections. It follows therefore that with a car or vehicle equipped with a system embodying my invention, it is possible to operate the car or vehicle efficiently by means of varying the supply of fuel to the engine and without any adjustment of the electrical connections. In connection with my system, it will be noted also that at no point does the curve C pass beyond the curve A which means that in no case will the load ever reach a value where it will stall the engine.

The purpose of storage battery 20 is to initially excite field 19 so as to cause the exciter voltage to build up quickly. I have found that this arrangement is just as effective as one wherein the storage battery is connected directly to the field of the main generator and has the substantial advantage that a much smaller battery can be used.

In Fig. 3, I have shown a modified form of my invention which differs from that shown in Fig. 1 only in that the differential field is placed on the exciter instead of on the generator. In Fig. 3 corresponding parts are indicated by the same reference numerals used in Fig. 1 with the exponent "a" added, the differential field winding on the exciter 7$^a$ being indicated at 17$^a$ and being opposed to the exciter field winding 19$^a$. The placing of the differential field winding on the exciter as opposed to placing it on the generator has the advantage that a smaller winding can be used thereby decreasing the cost.

In accordance with the provisions of the patent statutes, I have described the principle of operation of my invention, together with apparatus which I now consider to represent the best embodiments thereof, but I desire to have it understood that the apparatus shown is only illustrative and that the invention may be carried out by other means.

What I claim as new and desire to secure by Letters Patent of the United States is:—

1. In a system of the character described, the combination of an engine, controlling means for the engine, a generator driven by the engine, a load connected to the generator, a differential series field winding on said generator, an exciter for the generator which exciter is driven by the engine, a battery for initially exciting the field of the exciter, and means for opening the battery circuit when the controlling means for the engine is in "off" position.

2. The combination of an internal combustion engine, a generator driven thereby, a load connected to the generator, a second generator driven by the engine and serving as an exciter for the field of the first-named generator, a differential series field winding on one of said generators, a battery for exciting the field winding of the second generator, a switch in the battery circuit which switch is biased toward closed position, a control lever for the engine, and means whereby when the control lever is moved to "off" position the said switch is opened.

In witness whereof, I have hereunto set my hand this 14th day of June, 1924.

HERMANN LEMP.